United States Patent [19]

Balthes

[11] 4,192,124
[45] Mar. 11, 1980

[54] TOBACCO HARVESTER

[75] Inventor: Gary E. Balthes, Tillsonburg, Canada

[73] Assignee: Balthes Farm Equipment Manufacturing, Tillsonburg, Canada

[21] Appl. No.: 912,428

[22] Filed: Jun. 5, 1978

[51] Int. Cl.² ............................................. A01D 45/16
[52] U.S. Cl. ........................................ 56/27.5; 56/11.9
[58] Field of Search .................................. 56/27.5, 11.9

[56] References Cited

U.S. PATENT DOCUMENTS

| 3,841,071 | 10/1974 | Pinkham et al. | 56/27.5 |
| 3,999,359 | 12/1976 | Jordan et al. | 56/27.5 |
| 4,003,192 | 1/1977 | Jordan et al. | 56/27.5 |

Primary Examiner—Russell R. Kinsey

[57] ABSTRACT

A tobacco harvester comprises a pair of counter rotating defoliators overlying a pair of opposing spaced apart lateral transfer conveyors for conveying picked leaves outwardly from under the defoliators. A pair of belts are driven in opposite directions, portions of which oppose and are spaced apart from one another along opposing portions of the pair of lateral conveyors. The belt spacing is such to allow tobacco plant stalks to pass therebetween as opposing belt portions engage and support tobacco plant stalks. Side conveyors receive picked leaves from the pair of lateral transfer conveyors. The speed drives are arranged so that the rotary speed of the rotating defoliators, the conveying speed of the lateral conveyors, the conveying speed of the side conveyors and the linear speed of the belts are independently adjustable of one another. A pair of speed indicators may be provided to visually indicate the respective speeds of the picking rate of the defoliators and the ground speed of the harvester. The control devices are accessible to an operator while operating the harvester to permit matching of the two speeds to accomplish efficient mechanical tobacco priming and thereby reduce field loss and leaf damage.

8 Claims, 11 Drawing Figures

TOBACCO HARVESTER

FIELD OF THE INVENTION

This invention relates to tobacco harvesting equipment adapted to pick a level of leaves from a tobacco plant.

BACKGROUND OF THE INVENTION

The most reliable manner of tobacco priming is by the hands of skilled labour, however, due to the problems in finding labour force for such a short seasonal occupation, there is a strong demand for tobacco priming apparatus. There have been, however, several drawbacks with previously proposed tobacco priming machines such as high field loss, damage to the tobacco leaves in the form of bruising, cuts, tears and damage to the tobacco stalks causing stalk bleeding and consequent damage to the elevated higher quality tobacco leaves. Examples of tobacco priming apparatus are disclosed in U.S. Pat. Nos. 3,466,856 and 3,731,475. Both of these patents disclose priming apparatus using knives to cut the leaf stems in removing the leaves from the plant stalk. There are problems associated with such knife cutting of the leaves in that it is difficult to prevent damage to the tobacco stalk and ensure removal of all leaves at a leaf branching level on the plant stalk.

Another type of tobacco harvesting apparatus is that made by Harrington Manufacturing of Lewiston, N.C. and sold under the trade mark "ROANOKE". That type of harvester uses defoliators to break the leaves from the tobacco stalk, however, the apparatus has several shortcomings, among which it is relatively inflexible for varying field conditions resulting in several difficulties for the operator so that there has been a low acceptance of the harvester. Also associated with that harvester are substantial field losses and damage to the picked tobacco leaves.

With increasing difficulties in finding skilled labour for tobacco priming, it has been found that the quality of tobacco picking by hand has deteriorated to field losses and leaf damage in the range of 10 to 15%. This is an unacceptable loss for most tobacco growers therefore increasing the demand for an efficient tobacco harvester.

The tobacco harvester according to this invention overcomes a number of the above identified problems to provide an apparatus which picks the leaves from the plants and gently handles their transfer to storage bins on the harvester. The apparatus is easy to operate, has a great deal of flexibility in set up for varying field conditions such as row width spacing between plants, level of leaves on the plant to be picked, ambient changes such as dampness, dryness and plant characteristics such as brittleness in the leaf stems. The invention also provides the operator with a positive feed-back on the operation of the harvester to enhance performance.

SUMMARY OF THE INVENTION

The tobacco harvester according to this invention is for picking leaves from or priming tobacco plants having main standing stalks and various levels of tobacco leaves radiating randomly around the circumference of the main stalks. The apparatus has independent adjustment for the speeds at which various components of the apparatus operate to provide the operator with flexibility in setting up for tobacco priming from day to day.

According to an aspect of the invention, the tobacco harvester comprises a pair of counter rotating defoliators overlying a pair of opposing spaced apart lateral transfer conveyors for conveying picked leaves outwardly from under the defoliators. A pair of side conveyors receive picked leaves from the pair of lateral conveyors and convey rearwardly such picked leaves to a storage bin. A pair of belts are driven in opposite directions where at least a portion of the belts oppose and are spaced apart from one another along opposing portions of the pair of lateral transfer conveyors. As the harvester proceeds along the row, the belt's spacing is such to allow tobacco plant stalks to pass therebetween as the opposing belt portions engage and support tobacco plant stalks. The speed drives for these various components are such that the rotary speed of the defoliators, conveying speed of the lateral conveyors; conveying speed of the side conveyors and linear speed of the belts are independently adjustable of one another to provide flexibility in adapting to varying field conditions.

In addition, a scavenger device may be provided at the rear of each lateral transfer conveyor to assist in the gentle transfer of picked tobacco leaves or to pull partially broken leaves from the stalks and transfer them to the side conveyors. The scavenger device may include a plurality of flexible discs or wheels mounted on a supported shaft which places the disc perimeters adjacent the working surface of the corresponding lateral conveyor. The placing of the disc by the supported shaft is such to gently transfer the picked leaves and gently pull partially broken leaves from the stalks. The direction of rotation of the shaft is such to provide disc rotation which is compatible with the direction of lateral conveyor transfer and speed.

The various components of the harvester may be driven with independently controlled hydraulic motors to provide infinite variation in speeds of operation of the various components.

According to another aspect of the invention, the self-propelled harvester may have a tobacco leaf picking device, the picking speed of which can be related to harvester ground speed. A picking or priming speed control device is provided to vary the picking speed. A harvester speed control device is provided to vary the harvester ground speed. A pair of speed indicators visually indicate the respective speeds of the picking device and harvester. Such control devices are accessible to a harvester operator during harvest operation to permit matching of the two speeds as indicated by the pair of speed indicators. This arrangement substantially enhances performance of the harvester to reduce field losses previously due to the uncoordinated operation of the various components in the harvester relative to harvester ground speed.

DESCRIPTION OF THE DRAWINGS

These and other advantages and features of the invention will become apparent in the following detailed description of the preferred embodiments as shown in the drawings wherein.

DETAILED DESCRIPTION OF THE PREFERRED EMBODIMENTS OF THE INVENTION

Figures 1, 2:
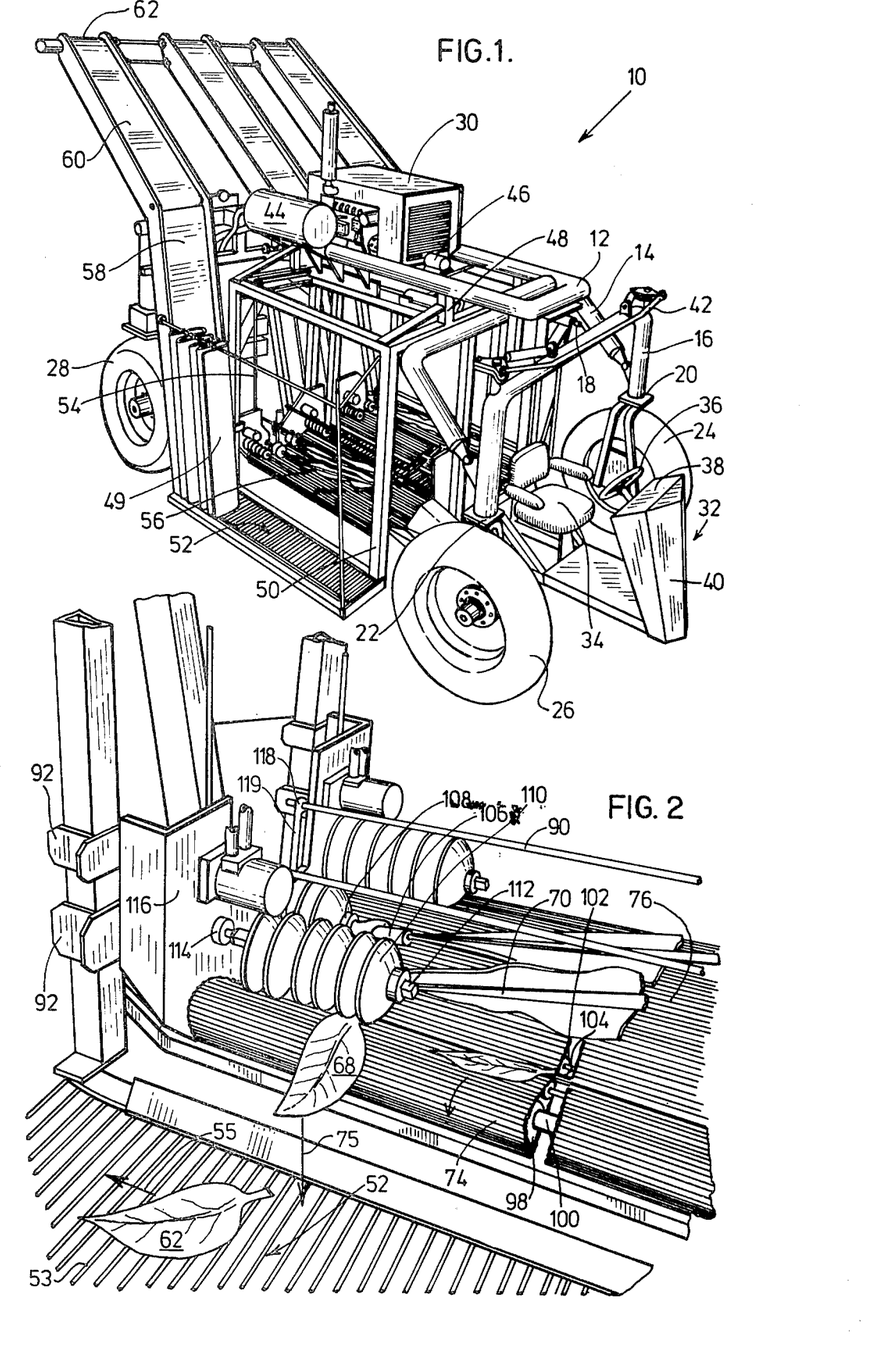
FIG. 1 is a perspective view from a front quadrant of the self propelled tobacco harvester.
FIG. 2 is a perspective view of a portion of the leaf defoliators, leaf conveyor and scavenger components.

FIG. 1 shows a self-propelled tobacco harvester including several preferred aspects of the invention. The harvester 10 comprises a main frame 12 from which a yolk 14 is centrally pivoted to support U-frame 16 pivoted at 18. At U-frame's lower ends, swivel connections 20 and 22 are provided for front stearing wheels 24 and 26. A downwardly depending back frame is secured to main frame 12 to which hydraulically driven rear wheels 28 are connected. A single power supply 30 in the form of a diesel engine, drives a hydraulic pump at the engine's rear to provide pressurized hydraulic fluid from reservoir 44 for the hydraulic drives for wheels 28 and drives hydraulic pump 46 to provide pressurized fluid for the several hydraulic drive motors for various components on the harvester. Slung lowly from the main frame 12 is the operator seat 34, stearing wheel 36 and control panel 38. Forwardly of the control panel 38, is a nose cone 40 which serves to deflect tobacco leaves in a manner so as to not be caught in the operator area and damaged. The stearing wheel 36 by way of power stearing mechanism 42 provides controlled stearing for the self-propelled harvester.

Secured to the main frame 12 is an under carriage 48 having downwardly depending arms 50 from which side conveyors 52 are secured for transfering picked leaves rearwardly of the harvester. Suspended from cables 54 are the picking and lateral conveying mechanism generally designated 56. The harvester is set up to pick two rows of tobacco at a time where the rows of tobacco plants pass to each side of the operator 34. Due to his central forward low position, he is close to the picking operation. The picked leaves are carried upwardly by further conveyor sections 58 and 60. A storage bin (not shown) is elevated to the discharge point 62 of each conveyor to collect the picked leaves. Conveyor 52 is a chain link conveyor having spacings between the various links to allow sand and dirt to escape from the picked leaves. Chain link conveyor 52 is an endless loop which extends the entire length of conveyor sections 52, 58 and 60. Overlying the endless chain link of conveyor sections 58 and 60 are smooth endless belts which are driven in a direction opposite to the chain link and at a compatible speed so that in the regions in which the chain link and belts oppose one another the tobacco leaves are gently sandwiched therebetween in their transfer to the storage bin.

Due to the compactness of the tobacco leave picking device of this invention, the harvester is adapted to be adjusted to harvest rows of tobacco plants ranging from standard 42 inch spacing up to less conventional 48 inch spacing. The harvesting of the narrower 42 inch row spacing could not be done with other harvesters because of their complexities in picking component arrangements. As a result tobacco harvesters were only able to work on rows planted 46 inches apart, thereby decreasing the plant population per acre.

Figure 3:
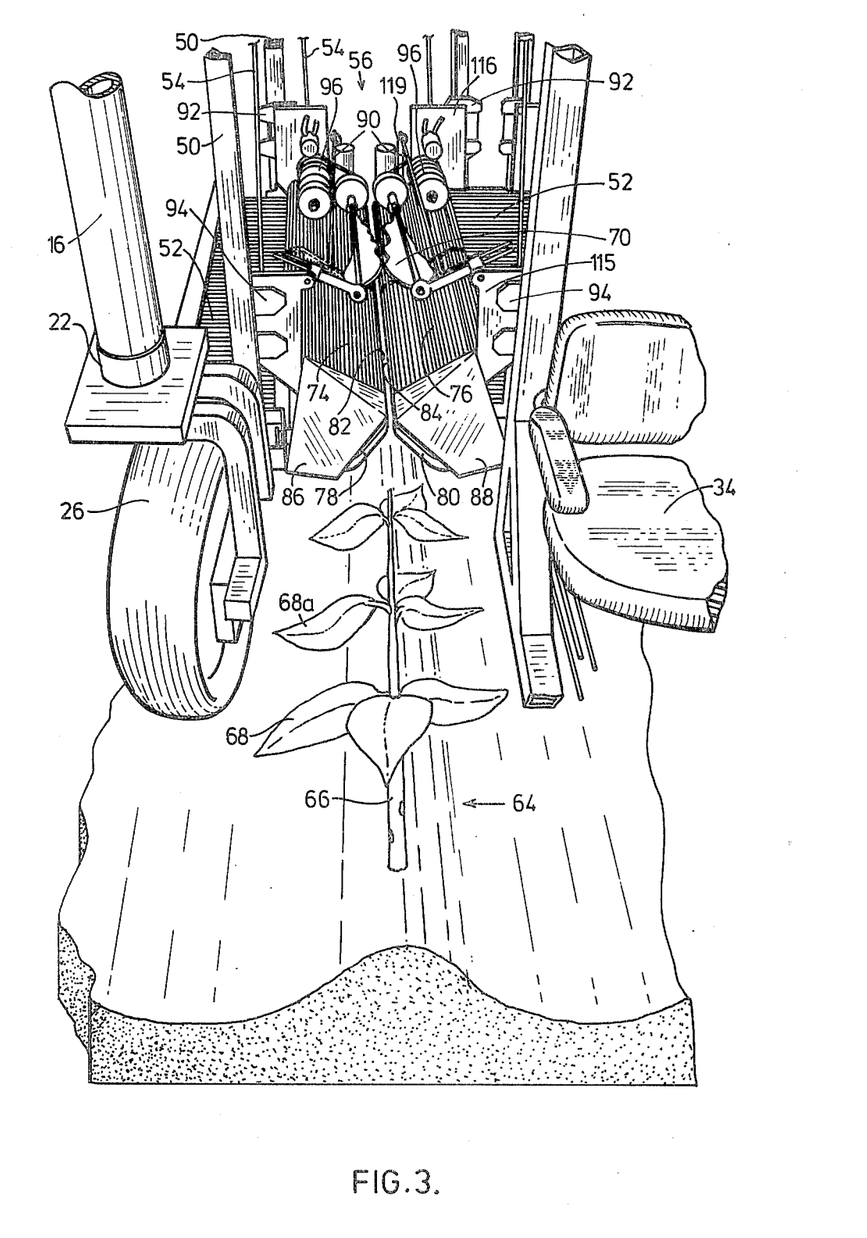
FIG. 3 is a front perspective view of the leaf picking apparatus.

Turning to FIG. 3, a tobacco plant 64 having an upstanding main stalk 66 has several levels of tobacco leaves 68 where at each level the leaves 68 are randomly spaced around the stalk's circumference. The picking device generally designated 56 comprises a pair of counter-rotating defoliators 70 overlying a pair of opposing spaced-apart lateral transfer conveyors 74 and 76. Lateral transfer conveyors 74, 76 transfer leaves picked or broken from stalk 66, by the defoliators outwardly to the pair of side conveyors 52. A pair of belts 78 and 80 are driven in opposite directions and for at least a portion of their travel, lie along opposing portions of conveyors 74 and 76. The belts are allowed to space themselves apart to allow the tobacco stalk 66 to pass between belts 78 and 80 in opposing areas 82, 84 as they engage and support the tobacco plant stalks.

To prevent the leaves from becoming entangled in the belts 78 and 80 the lead in portion of the picker presents a V-shaped entry where cowlings 86 and 88 ensure a gentle delivery of the tobacco leaves rearwardly onto or over the working surfaces of lateral transfer conveyors 74 and 76. The picker 56 is set at a level as governed by cables 54 to pick the lower level of leaves 68. Bars 90 are located above and outwardly of the defoliators prevent the second level of drouping leaves 68a from becoming entangled in the defoliators. As is appreciated by those skilled in the art of tobacco priming, leaves 68a must be left on the plant stalk for further ripening while leaves 68 are being picked.

The picking device 56 consists of a pair of mirror image components mounted on supporting frames suspended from cables 54. The supporting frames include front plates 115 and rear L-shaped frames 116 on which the conveyors 74 and 76, defoliators 70 and belts 78 and 80 are mounted. The rear frame 116 has a channel member 92 adjustably mounted thereon as more clearly shown in FIGS. 4 and 5. The adjusted channel members 92 provide the desired spacing at the rear of the picker between belts 78 and 80. Plates 94 secured to plates 115 abut legs 50 in the manner more clearly shown in FIG. 4. The plates 94 as they slide against the legs 50 permit the conveyors 74 and 76 to move away from each other to accommodate varying sizes of tobacco stalks between belts 78 and 80. Plates 94 may have holes to provide various adjusted positions for the spacing between belts 78 and 80. Such adjustment may be necessary for sand leaf priming because the belts may occassionally become embedded in the ground and if the plates 94 were not secured to the legs 50, this could enduce bouncing in the conveyor and consequent field loss and leaf damage.

Figure 4:
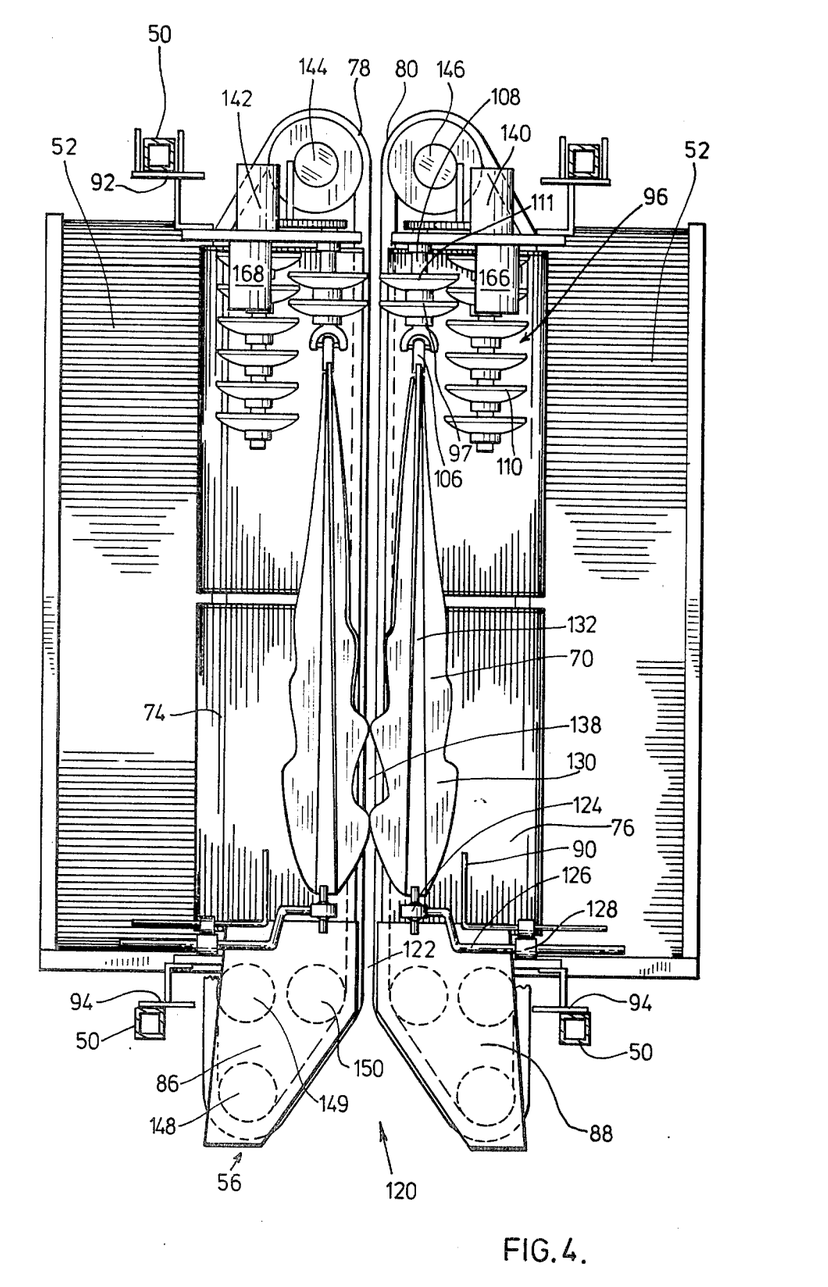
FIG. 4 is a top view of the leaf picking apparatus and related conveyor systems.

Located at the rear of the lateral conveyor 74, 76 are scavenger units 96 which gently transfer any leaves which have moved to the rear of the conveyor. Scavengers 96 also assist in pulling partially broken leaf stems from the stalk 66 to complete removal and transfer of the leaves to side conveyors 52.

Turning to FIG. 2, a close up of conveyor 52 shows the spaced apart bars 53 of the chain link conveyor system. The picked tobacco leaves 68 are transferred laterally by conveyor 74 and dropped in the direction of arrow 75 onto conveyor bed 52. The conveyor 52 transfers the tobacco leaves 62 in the direction of arrow 55 to be picked up by the conveyor sections 58 and 60. The lateral conveyor 74 consists of two segments, each comprising a chain link system having a plurality of spaced apart bars to allow sand and dirt to fall away from the picked leaves. The chain link system is driven by gears 98 which are secured to drive shaft 100. Idler wheels 102 are secured to shaft 104 over which the conveyor is trained.

The scavenger device 96 consists of a plurality of flexible discs or wheels 110. According to a preferred embodiment, the discs are made of rubber having a durometer rating of 40. The discs are mounted on a supported shaft 112 which is journaled in support bearing 114 on box frame 116. The bars 90 are secured at their rear ends 118 to stantards 119.

The top view of the picking apparatus 56 as shown in FIG. 4 illustrates the relationship of the defoliators and belts to the lateral conveyors, scavengers and side conveyors. The front portions defined by the cowlings 86 and 88 may float as the plates 94 slide against the legs 50 so that the V-shaped entrance 120 can accommodate tobacco stalks which are not directly aligned with the gap 122 defined at the mouth of the picking device. It should be noted that for the sake of illustration, gap 122 has been shown as related to a stalk between the belts, however, it is understood that in a normal static condition, the gap would close because gravity causes the suspended support frames to move inwardly so that belts 78 and 80 abut.

Figures 8, 9, 10:
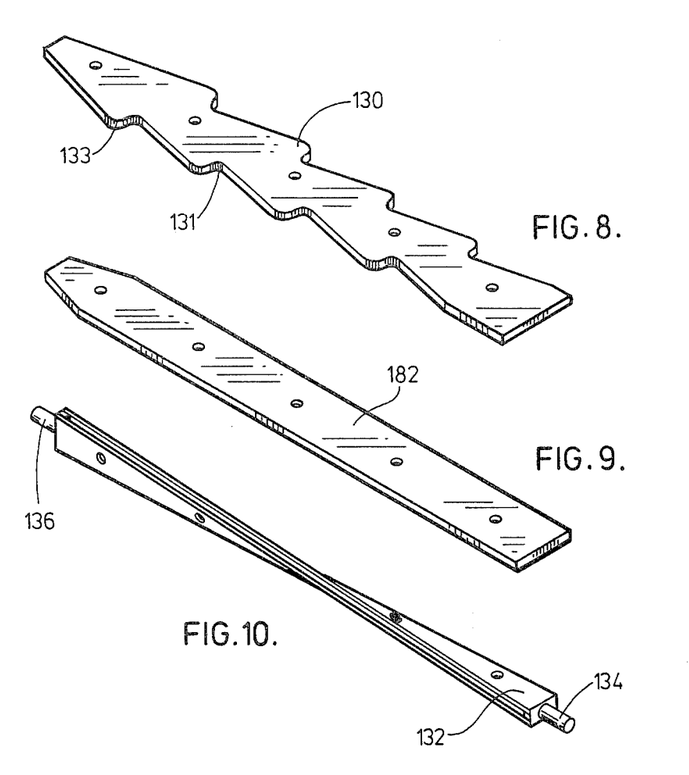
FIG. 8 is a view of one type of defoliator paddle.
FIG. 9 is a view of another type of defoliator paddle.
FIG. 10 is a view of a bar on which one of the defoliator paddles is mounted.

The front of defoliators 70 is mounted in swivel bearing 124 connected to arm 126 which in turn is releasably secured to adjustably rotatable block 128. Block 128 is mounted on plate 115 by a fastener which, when released, permits rotation of block 128 to a new position. The length of rod 126 may be slid inwardly and outwardly of block 128 to vary the relative spacing or overlap between defoliators. The rear of defoliators 70 is connected by universals 106 to drive shafts 108. Turning to FIG. 8, a view of the defoliator paddle 130 reveals the notches 131 offset relative to each other along the sides of the paddle 130. The paddle is mounted on a twisted bar 132 as shown in FIG. 10. The extent of the twist is 90° from front to back of bar 132. The shaft portions 134 and 136 are connected to the universal 106 and the swivel bearing 124 as shown in FIG. 4.

In positioning the paddle 130 in the bar 132, the tips 133 define a focus of points which is a spiral or helix. The defoliators are mounted so that the twist along their lengths are in opposite directions. The defoliator paddles are spaced apart so that the tips 133 may be touching or slightly overlapped. The paddles are counter-rotated so that in the area of their meeting or opposing one another, there is a downward component of movement. The rotation of the paddles is such that the leading tips 133 on each paddle are the first to move through the opposing area of the defoliators thus defining a gap 138 between notches 131. The depth, shape and relationship of the notches 131 of the paddles are such to define a gap 138 or area which accommodates and envelopes varying tobacco plant stock sizes. As the counter-rotation of the paddles is continued the gap 138 as it is developed propagates or travels from the front to the rear of the paddles. The speed at which the gap propagates from front to back depends on the rate of rotation of the paddles and their inclination from back to front.

According to a preferred aspect the rotation of the paddles is synchronized so that the leading tips of the paddles are the first to meet. This developes a gap of the type shown which readily encompasses the plant stalk. The defoliators 70 are driven by hydraulic motors 140 and 142, the speeds of which may be varied to thereby adjust the speed at which the developed gap 138 travels from front to back along the picking device 56. Several notches are provided along the paddles so that slower rotation of paddles is all that is needed to accommodate movement of plants in the developed gaps. For example, for plants located approximately 2 feet apart along the row, 4 notches down each side of the paddles are adequate.

The belts 78 and 80 are driven by hydraulic motors 144 and 146. The belts are trained over idler pulleys 148, 149 and 150 to define the V-shaped entrance 120. The belts are driven in opposite directions so that along their extent where they opposed each other beneath the defoliators they are travelling in the same direction and at the same linear speed. Channel shaped supports are provided behind the belts in the area in which they oppose one another.

As shown in FIG. 3 the tobacco plant is feed into the picker where opposing portions of belt 78 and 80 engage the stalk. The floating frames allow the belts to move apart in accommodating the plant stalk and to apply gentle pressure in supporting the stalk. The belt's linear speed can be set to be the same as the ground speed of the harvester. With this speed relationship of the belt moving rearwardly of the machine as the machine moves forwardly, then the opposing portions of the belts engage the stalk where the stalk remains stationary relative to the belts to avoid any chipping or scraping of stalk sides. For example, should the vehicle be travelling at 3 miles per hour then the linear belt speed as they pass beneath the defoliators must be 3 miles per hour to retain this stationary relationship between stalk and belt as the plant is passed through the picking device.

Figure 5:
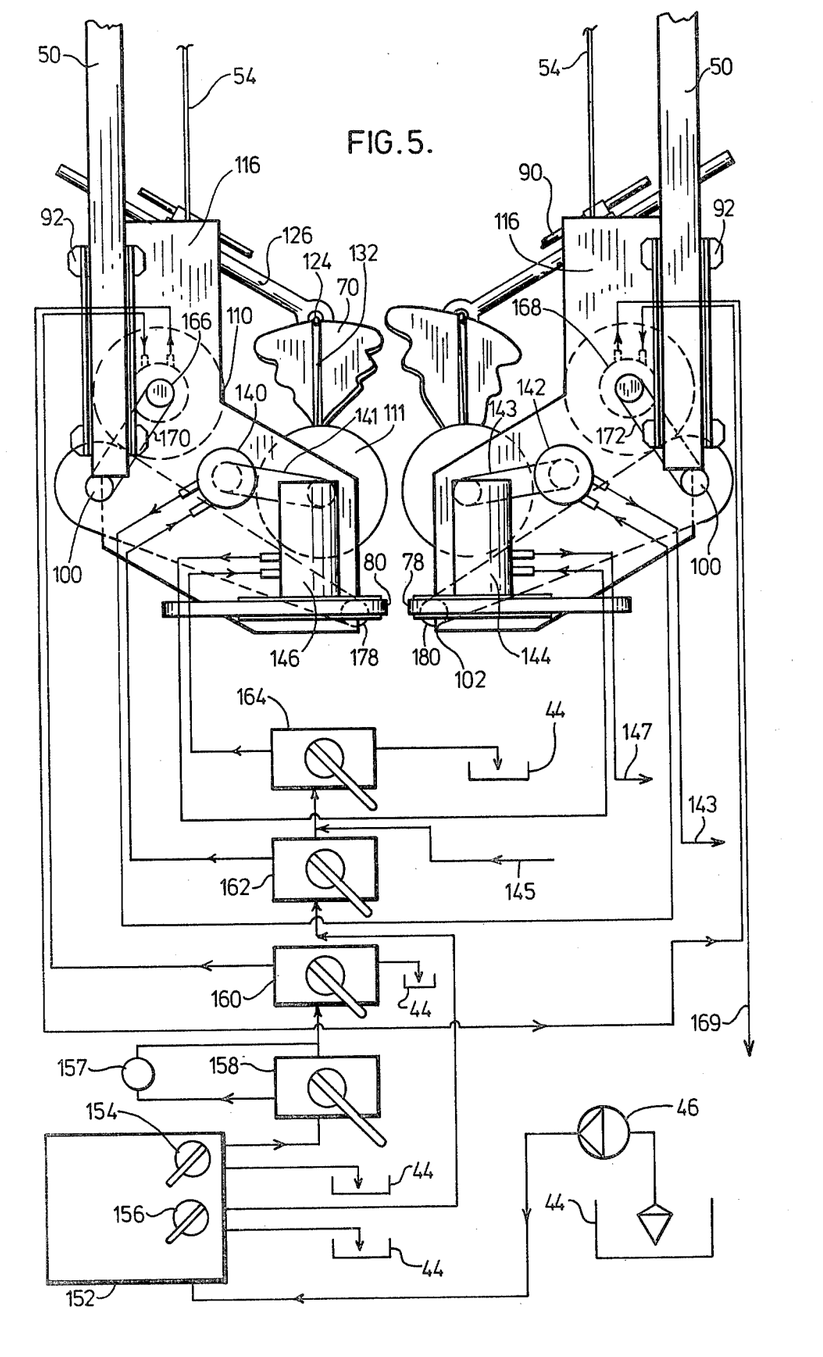
FIG. 5 is a rear view of the leaf picking apparatus and the independent hydraulic motors for driving the apparatus components and the hydraulic controls for such motors.
Figure 6:
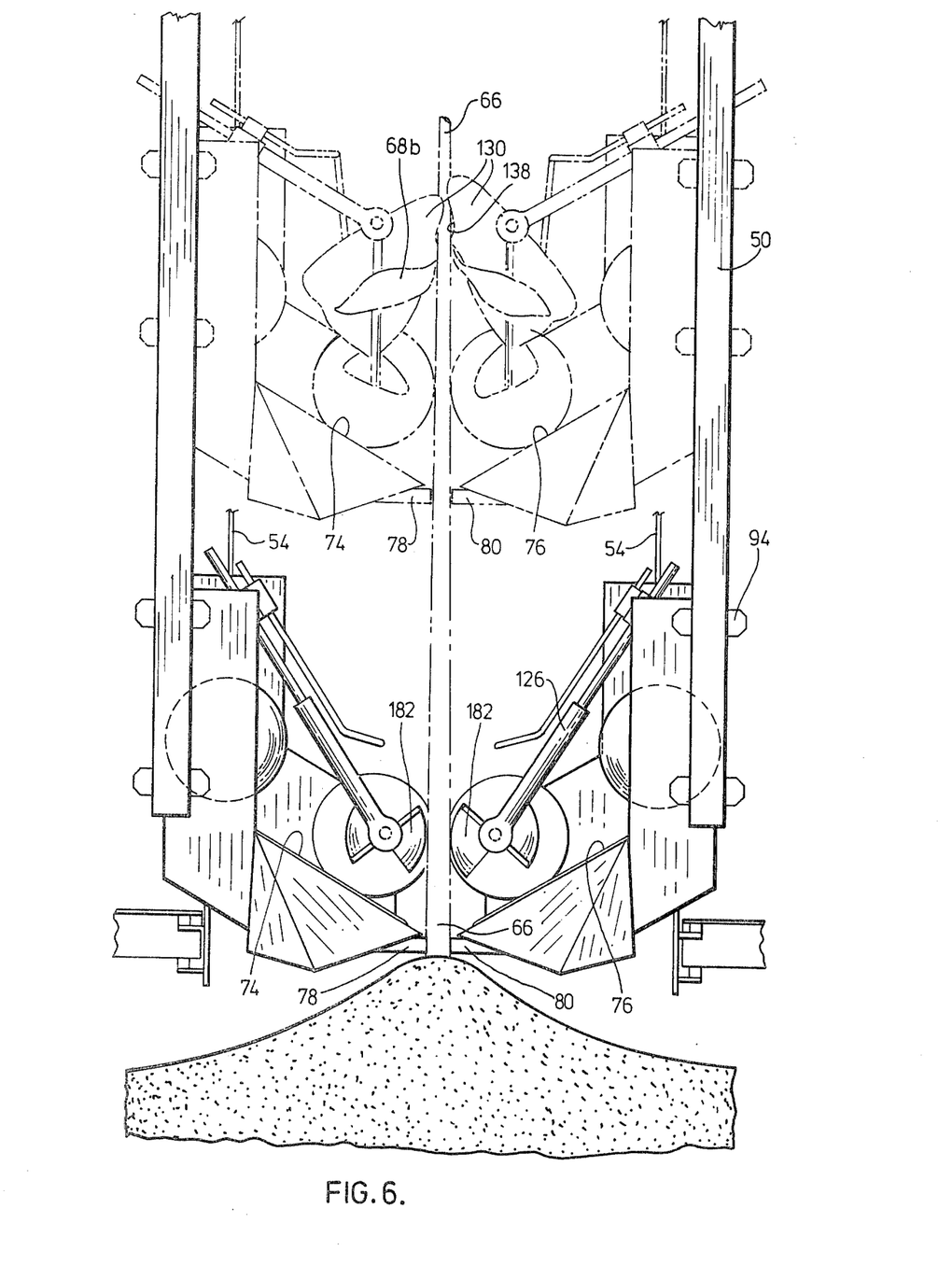
FIG. 6 is a front view of the leaf picking device in its lower most position for picking sand leaves and in a more elevated mid-position for picking lugs.

The picking device of FIG. 3 has been set up to remove the lower most layer of leaves 68. The defoliators 70 are positioned so that their heads or forwardmost portions are above the anticipated level of the leaves 68. Such a set up of course can be accomplished by the operator of the vehicle before he begins picking the row of tobacco. To compensate for variations in leaf position on the plant for a particular level, the defoliators slope downwardly from front to back. The extent of angular inclination can be varied by adjusting the block 128 to raise or lower the arm 127 as the block is rotated. Such adjustment is accomplished by releasing fastener for block, rotating to new desired position and retightening fastener. Inward and outward adjustment of bar 126 can vary the size of gap 138 as the gap propagates along the length of the paddles. The extent of the slant of the defoliators is shown in FIGS. 5 and 6 and according to a preferred embodiment may be varied from horizontal up to approximately twenty degrees.

The height of stalk covered and from which leaves can be picked by the defoliators, may be in the range of 4 to 10 inches over approximately a 36 inch length of defoliator. As previously mentioned the speed at which the gap 138 moves along the length of the defoliators may be varied by varying the speeds of the hydraulics motors 140 and 142. Prior to picking the tobacco the rate of propagation of the gap is set so as to correspond to the harvester speed. For example, should it be expected that the harvester will proceed at 3 miles an hour, the rate of gap propagation or movement is set in the rearward direction of 3 miles an hour. The linear speed of the belts 78 and 80 is also adjusted to the same speed. Upon entry of a tobacco plant into the picker, the stalk finds its way into a gap 138 as defined at the front of the defoliators. This gap as it encompasses or surrounds the plant stalk, results in the defoliators breaking off the tobacco leaves from the tobacco stalk where at all times the tobacco stalk is maintained in relatively consistant vertical position without causing stalk bending. The belts support the stalk base to support the stalks as the leaf stems are broken away from the stalk to resist any bending moment exerted on the plant stalk during leaf stem breakage.

The defoliator paddles 130 are made of very flexible rubber. According to a preferred aspect of the invention they may have a durometer rating of approximately 50. As a result the tobacco leaves are gently broken off the stalk as caused by the defoliators pushing the leaf stems downwardly. The height on the stalk over which leaves are picked is covered by the downward movement of the gap on the stalk due to the defoliator slant. The picked leaves lay on the working surface of the conveyors 74 and 76 which convey the leaves outwardly onto side conveyors 52. To ensure that leaves fall onto conveyor 52, curtains 49 as shown in FIG. 1 are provided to block the leaves from flying past conveyor 52.

Due to the compactness and effectiveness of the scavenger system, the defoliators are of a longer length than found in prior art harvesters. It is possible to maintain a lower angle for the defoliators to achieve the desired band of height coverage on each tobacco plant. As a result the rate at which the defoliators are rotated to achieve a gap propagation of a desired speed to correspond to vehicle speed is much less than with prior art systems of much shorter length defoliators. The slower speed of the rotation of this apparatus provides for the gentler removal of leaves from the stalk.

In providing for a low incline of the defoliator 70, on entry of the plant into the defoliating area, the lower incline is more apt to gently receive the plant than when the defoliators are inclined steeply which can beat the plant forwardly away from the defoliators. Due to the flexibility of the rubber, should the plant stalk not immediately line up with a gap being developed at the front of the defoliators, the paddles flex to accommodate the tobacco stalk as it finds its way into a gap.

Depending upon the condition of the plants during picking, some leaf stems may be more flexible than others so that the defoliators do not break the stem cleanly away from the stalk. As a result the leaf, as partially attached to the stalk, lies on and moves rearwardly on the conveyor 74 or 76. In order to strip in a gentle manner such leaves away from the stalk, scavenger 96 with assisting scavengers 97 remove such leaves. Scavengers 96 project ahead of the rear of the defoliator 70 so that as can be appreciated, leaves which are lying on the conveyors will be sandwiched between the discs 110 and the conveyor bed and due to their compatible rotation will pull the leaf away from the stalk to complete removal of the leaves with gentle transfer of such leaves to the conveyor 52. Additional scavenger assists in the form of discs 111 help the scavenger 96 should the leaf at that point have moved this far rearwardly of the defoliators. They ensure that leaves are not lost from the rear of the unit. Such discs 111 are the same as those 110 however, they are not in contact with the conveyor so as to gently enduce movement of the leaves up and into the principal scavenger 96.

Turning to FIG. 5, the hydraulic drives for the various components of the picking device and conveying system are shown. The pump 46 supplies hydraulic oil under pressure from reservoir 44 to a line splitter 152. Controls 154 and 156 control the flow rate of pressurized hydraulic fluid to metered control valves 158, 160, 162 and 164. Valves 158 and 160 control the flow rate of hydraulic fluid as supplied by valve 154 to run the hydraulic motors. Valve 160 controls the drive speed of motors 166 and 168 which drive in combination the scavengers and the lateral transfer conveyors 74, 76 by chain systems 170 and 172 as connected to shafts 100 which carry the drive sprockets 98 shown in FIG. 2. Line 169 leads to serially connected motors for the lateral conveyors and scavengers of the other picking device. From these motors, the hydraulic fluid is returned to the reservoir 44. Valve 162 controls the drive speed of serially connected motors 140 and 142 which drive the defoliators in counter-rotating manner via chains 141 and 143. Line 143 leads to serially connected motors for the defoliators of the other picking device. Line 145 returns from these motors to feed into valve 164 with any excess from valve 162. Valve 164 controls the drive speed of motors 144 and 146 which drive the belts 78 and 80. Line 147 leads to serially connected motors for driving the belts of the other picking device. From these other motors, the hydraulic fluid is returned to the reservoir 44. Such an arrangement of valves and hydraulic lines provides independent adjustment of the side conveyor speed, the scavenger and lateral transfer conveyor speed, the defoliator speed and the belt speed. Such independent controls provide great flexibility in adjusting for variations of field conditions for picking various types of tobacco for any tobacco operation around the world, such an adjusting for leaf stem brittleness, dampness, dryness, variation in vehicle speeds etc. The controls 154, 156 are located convenient to the cab operator station so that the speeds at which the conveyors operate while harvesting can be varied independently of the speeds at which the defoliator and belts are running.

The hydraulic motor 157 for the side conveyors is arranged so as to be controlled by valve 158 in the manner to coordinate such movement with transfer of the leaves rearwardly from the lateral conveyors at a speed to keep the area clear and in turn transfer them upwardly through the remainder of the conveyor system 58 and 60 to the storage bin.

The positions of the scavenger disc 110 are adjacent and in touching contact with the surface of conveyors 74, 76. Due to the support provided by the shafts 112, neglibible force is applied to the conveyor surface, if none at all, depending upon the placing of the shaft 112. This minimizes the rough handling of the tobacco leaves to substantially reduce any bruising or disconfiguration to the leaf as it is being completely removed from the tobacco stalk by the scavenger discs.

As shown, the discs 111 of the assisting scavenger 97 are spaced from the surface of the conveyor. This allows the defoliator speeds 70 to differ from the conveyor movement so that there is no interference between the linear velocities of the disc 111 and the conveyor portions 74 or 76.

The relationship of the belts 78 and 80 relative to the conveyors 74 and 76 can be seen. The belts are slightly above the lower level of the opposing portions 178 and 180 where their spacing is such to engage and support the tobacco plant stock.

As explained with respect to the principal of operation of the defoliator 70, coordination between the rate of propagation of the gap and the belts 78 and 80 can be achieved by adjusting the metered valves 162, 164. As mentioned before, the flexibility in varying the speed of the defoliators relative to the belt is necessary because in changing the angle of inclination of the defoliators, they have to be speeded up or slowed down to achieve a gap movement corresponding to the linear speed of the belts. Therefore, on set up, the valves 162, 164 are adjusted to give the desired feed rate for the picking device, for example, a feed rate which would correspond to the picking device moving past the plant at 3 miles per hour.

Figure 11:
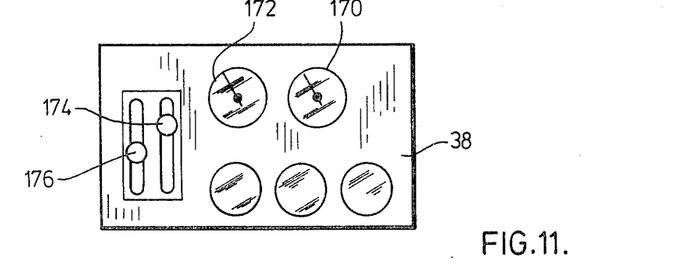
FIG. 11 shows the control panel for the selfpropelled tobacco harvester.

Referring to FIG. 11, the rate of picking may be indicated on a visual indicator such as speedometer 170. This speed may be derived from the linear speed of the belt 78 or 80 by measuring the speed of rotation of the pulleys driving the belt, or by engaging the belt with a pulley to in turn drive the speedometer 170. The defoliators 70 have had their speed adjusted to correspond with the linear speed of the belts so that on varying the control 156, the defoliator speed and the belt speed remain synchronized in adjusting the feed rate. An additional speedometer 172 indicates the ground speed of the vehicle as controlled by the shift lever 174. The shift lever 176 varies the engine speed, therefore in positioning shift lever 174 at a location to provide a self-propelled vehicle speed of 3 miles per hour then valve 156 can be adjusted to provide a three mile per hour reading on speedometer 170. As a result, the operator has an accurate indication of the operating conditions of the harvester to enhance performance in reducing field loss by possible improper defoliation or missing leaves on the stalks due to improper relationships between the vehicle speed and the picking rate of the picking device. Conversely, on having set the picking rate of the device, as indicated by speedometer 170, the operator can vary the vehicle speed by moving lever 174 to maintain it at a speed synchronized with speed of speedometer 170.

With the hydraulic drives for the various components of the picking apparatus, infinite speeds can be achieved by varying the position of the metered valves 158, 160, 162 and 164; the input to which is also adjusted by valves 154 and 156. Infinite speed for the hydraulic drives on the drive wheels 28 is controlled by shift lever 174. Such use of hydraulic motors therefore substantially enhance the control on the vehicle speeds to optimize the picking tobacco harvester performance.

The hydraulic drives for the defoliators, namely motors 140 and 142 in series are so arranged with metered valve control 162, that when the paddles encounter a stalk which does not properly fit into a developing gap at the lead in part of the defoliator, the series connection of motors will permit a slight slowing down of the defoliators as the stock finds its way into the developing gap. This slow down of the rotation of the defoliators is momentary because pressure build up will in turn increase the rate of rotation of the defoliator after time has been provided for the tobacco stalk to properly locate itself in the defoliator. This arrangement thereby ensures a gentle handling of the tobacco stalk and in no way forces it to a position which could result in damage to the stalk or the leaves.

FIG. 6 is a front view of the picking device where the tobacco stalk 66 is sandwiched between or engaged by opposing portions of belts 78 and 80 to support the stalk base as the defoliator paddles 130 move downwardly over the stalk. As previously mentioned, the rods 126 are so positioned to ensure that the level of tobacco leaves to be picked underlie the paddles 130 as they move towards each other in the manner shown in FIG. 6. As the stalk is received in the gap 138, with the downward movement of the paddles and the downward slope of the defoliators causing the gap to move downwardly of the stalk, the leaf stems are pushed downwardly and broken away from the plant stalk to be deposited on the conveyor surfaces 74 and 76. The height adjustment of the picking device is varied by adjusting the cables 54 which may be done hydraulically with block and tackle arrangement to evenly adjust the support frame's position. For the lower position, the defoliators may be adapted to remove the lowermost level of leaves commonly referred to as sand leaves. The type of defoliator paddle for use in this instance is shown in FIG. 9. The paddle 182, like paddle 130, is mounted in bar 132. It is of a narrower construction than paddle 120 so as to be positioned lowermost in the picking device. Due to the opposing twists in the rods 132 and the counter rotation of the defoliators, a V-shaped gap is developed as it propagates along the length of defoliators. The downward movement of the paddles as the plant proceeds through the defoliators, results in knocking the sand leaves downwardly onto the conveyors and in turn transfer to the storage bin. The sand leaves may be damaged somewhat in this process, due to their closeness to the ground, however it is appreciated that the sand leaves are of little importance in the tobacco industry and are used mostly as fillers. Further in taking off the sand leaves, the plates 94 may be secured to lower depending arms 50 so that should the belts 78 and 80 encounter stones and the like, this will not cause the conveyor system to swing wildly to avoid damage to the more important upper leaves commonly referred to as lugs.

The upper level of the defoliators may be slightly above the level of the leaves to be picked. This ensures that approximately 90% of the leaves will be picked and dropped onto the foremost segment of conveyors 74 and 76. The remainder of the leaves, approximately 10% will be removed by the lower portions of the defoliators and deposited on the rearward segments of the conveyor 74 and 76. In turn any leaves remaining on the plants which have only been partially broken away are scavenged by the scavengers 96 to complete removal and transfer to side conveyors 52.

By retracting the cables 54, in moving the block and tackle arrangement, the picking device may be elevated as shown in broken lines to pick a higher level of leaves as represented at 68b of stalk 66. As can be seen, the defoliator paddles 130 are moving the leaves downwardly as the gap 138 surrounds the stalk to break the leaf stems and deposit them on the conveyor surfaces 74 and 76. In turn the belt portions 78 and 80 support the stalk to resist stalk bending as the leaf stems are broken away from the stalk. Such an arrangement provides adequate picking for the removal of the lugs from the tobacco plants.

The most valuable leaves on the plant are referred to as the tips which is the upper level of leaves remaining on the plant. It is important to ensure a gentle removal of the leaves from such plant to maintain a high quality tip leaf. In this instance, the stalk in the upper region is quite weak and it has been found that a second set of belts is necessary to support the stalk and prevent it from pivoting about the upper level of belts in the manner shown in FIG. 7. The belts 78A and 80A are driven at the same speed as belts 78 and 80 so as to ensure smooth transfer of the tobacco plant through the picking device.

Figure 7:
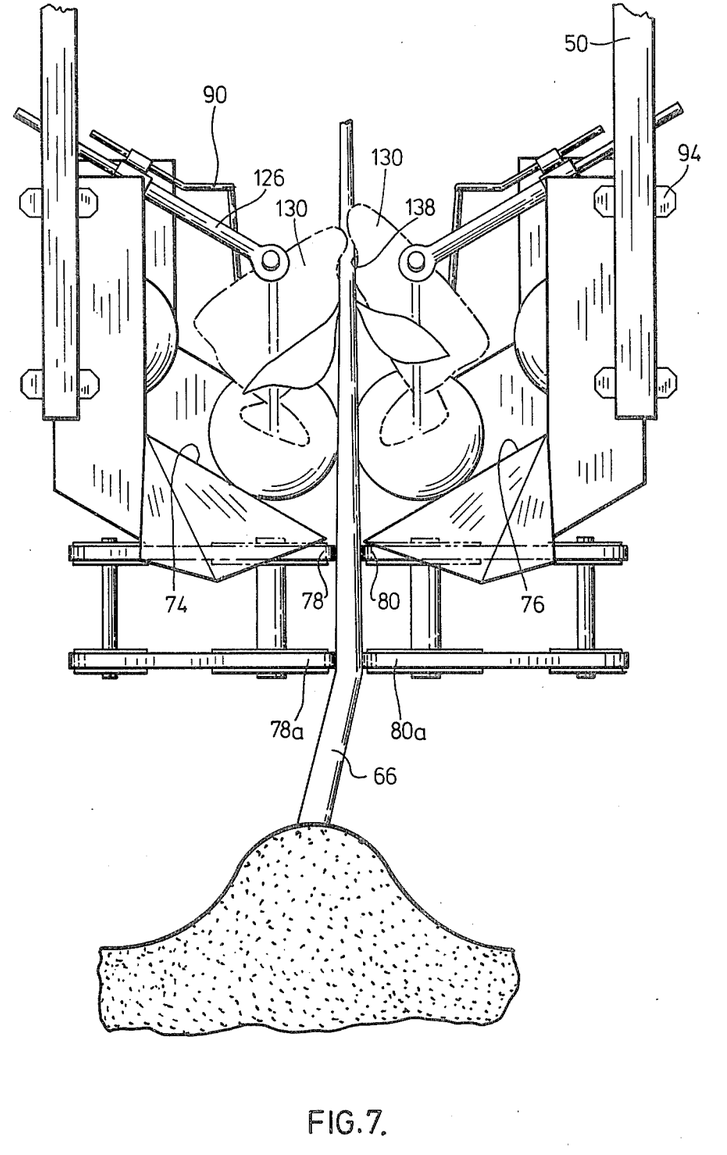
FIG. 7 is a front view of the picking device in its upper-most position to pick the t p leaves wherein two stalk supporting belt systems are provided.

The defoliator paddles 130 as they move downwardly overlapping the leaves as the gap 138 encompasses the stalk, breaks the leaves off the stem 66 to deposit them on the conveyors 74 and 76. For this operation the plates 94 may be secured to depending leg portions 50 of the frame to set a particular gap between the belts to firmly grip the stalk between the duplicate set of belts so that the stalk is not bent downwardly away from the defoliators 130 prior to the removal of the tip leaves.

The harvester according to the invention provides great flexibility in set up for tobacco priming to compensate for varying changes in picking conditions and plant variations as enabled by the independent speed controls for the various components of the picking device. The positive feed back provided by the controls at the operator station ensures an efficient operation of the machine to synchronize the picking speed with the self-propelled speed to substantially reduce field losses and leaf damage. Such flexibility in operation and feed back to the harvester operator, enables him to compensate for varying field changes without having to call in an expert to set up the machine each time harvest is needed. The machine with its flexibility can be adapted for varying uses on tobacco farms throughout the world. The frame of the harvester may also be constructed so that the conveyors and frame member 48 are removable from the main frame 12. The self-propelled unit can be readily adapted for use as sprayer and other uses on the tobacco farm to provide an all round farm vehicle.

Although the various preferred embodiments of the invention have been described herein in detail, it will be understood by those skilled in the art that variations may be made thereto without departing from the spirit of the invention or the scope of the appended claims.

The embodiments of an invention in which an exclusive property or privilege is claimed are defined as follows:

1. A tobacco leaf picking device for attachment to a tobacco leaf harvester comprising a pair of support frames, a pair of defoliators, each rotatively mounted on a respective support frame, a hydraulic drive means for rotating said pair of defoliators in counter-rotating manner, a pair of conveyors each mounted on a respective support frame located beneath one of said defoliators, independent hydraulic drive means for moving said conveyors in opposite directions to convey picked leaves outwardly from under said defoliators, a pair of endless belts each mounted on a respective support frame by pulley means to oppose one another along the length of opposing sides of said pair of conveyors, independent hydraulic drive means for driving said belts in opposite directions where said belt mounting in combination with attachment of support frames to a harvester permits opposing belt portions to engage and support tobacco plant stalks as the plants pass through the leaf picking device, a separate control means for each of said independent hydraulic drive means, the speeds at which said defoliators, conveyors and belts are driven being independently adjustable of one another by each of said separate control means.

2. A tobacco leaf picking device of claim 1 wherein said leaf scavenger device comprises a plurality of flexible wheels mounted on a support shaft which places the wheels adjacent the corresponding conveyor, said shaft being rotated in a direction and at a speed to provide wheel rotation which is compatible with the direction of conveyor transfer and speed, the arrangement of wheels relative to conveyor being such to transfer delicately tobacco leaves moving between said wheels and conveyor.

3. A tobacco leaf picking device of claim 1 wherein said pair of defoliators comprise a pair of paddles which have a downward component of rotational movement as they rotate past one another thereby directing picked tobacco leaves onto underlying pair of conveyors.

4. In a self-propelled tobacco harvester, having a tobacco leaf picking device with counter-rotating defoliators overlying a pair of driven conveyors moving in opposite directions to convey picked leaves outwardly from under said defoliators, a leaf scavenger positioned at the rear of and over each of said conveyors, said leaf scavenger comprising a plurality of flexible discs mounted on a rotatably driven shaft mounted to harvester frame which supports the discs in touching contact with the working surface of the corresponding conveyor, means for driving said shaft to rotate at a speed and in a direction to provide disc rotation which is compatible with the direction of conveyor transfer and speed, said discs, as driven and contacting said driven conveyor, gently grip leaves overlying conveyor with their stems partially broken from stalk to pull gently such leaves to complete leaf removal and transfer outwardly from under said defoliators.

5. In a self-propelled tobacco leaf harvester, a tobacco leaf picking device comprising a pair of defoliators each rotatably mounted on a respective portion of harvester frame, independent hydraulic drive means for rotating said pair of defoliators in counter-rotating manner, a pair of conveyors each mounted on harvester support frame, each located beneath one of said defoliators, independent hydraulic drive means for moving said conveyors in opposite directions to convey picked leaves upwardly from under said defoliators, a pair of endless belts each mounted on a respective support frame by pulley means to oppose one another along the length of opposing sides of said pairs of conveyors, independent hydraulic drive means for driving said belts in opposite directions where said belt mounting on harvester support frame permits opposing belt portions to engage and support tobacco plant stalks as the plants pass through the leaf picking device, a separate control means for each of said independent hydraulic drive means, the speeds at which said defoliators, conveyors and belts are driven being coordinated by independent adjustments by each of said separate control means, means for determining linear speed of said belts, means for determining the harvester ground speed, a pair of speedometers for visually indicating the respective detected speeds of belts and harvester, said harvester having an operator station with accessible control devices to permit a harvester operator to match the speeds indicated on said pair of speedometers during operation of harvester.

6. In a self-propelled tobacco leaf harvester of claim 5, said defoliators having rate of feed dependent upon their speed of rotation, said separate control means permitting matching of belt speed and defoliator rate of feed, in providing a picking speed for leaf picking device.

7. In a self-propelled tobacco leaf harvester of claim 6 said defoliators so configured and arranged to define a gap which moves from front to back of the defoliators as they counter-rotate, the speed at which said gap moves being said feed rate.

8. A tobacco leaf picking device of claim 1 wherein an additional flow control is provided to control flow of hydraulic fluid to said separate control means which control and are adjustable to coordinate defoliator speed with belt speed, said additional flow control varying coordinated speeds of said defoliators and belts.

* * * * *